March 11, 1958 G. BARSKY 2,826,601
SYSTEM FOR PRODUCING CYANOHYDRINS
Filed Feb. 5, 1957

*INVENTOR.*
GEORGE BARSKY
BY
ATTORNEY

United States Patent Office 2,826,601
Patented Mar. 11, 1958

2,826,601

SYSTEM FOR PRODUCING CYANOHYDRINS

George Barsky, New York, N. Y., assignor to Carbogen Corporation, a corporation of New York Application February 5, 1957, Serial No. 638,890

13 Claims. (Cl. 260—465.6)

The present invention is directed to the production of cyanohydrins by the reaction of a liquid carbonyl substance and HCN gas.

The present invention is an improvement in the method described and claimed in applicant's prior Patent No. 2,731,490, issued January 17, 1956, and entitled "Method of Making Cyanohydrins." According to said patent cyanohydrins are made continuously by causing a gas containing HCN to pass upwardly through several zones with an aqueous solution of alkali introduced into the uppermost zone and flowing downward. In an intermediate zone, the carbonyl compound is introduced whereby a reaction takes place with the absorption of the HCN and the formation of the cyanohydrin. As the product passes downwardly, there is introduced an acid sufficient to neutralize the alkali and thus to stabilize the product. In the lowermost zone, the product is heated to vaporize any reacted HCN which passes upwardly for reaction with additional carbonyl substance.

The method of this patent is quite satisfactory and good results are obtainable by following the procedure. However, improvement in the process is possible and desirable and particularly in that the HCN generally used in the operation is a very dilute material containing only about 8% of HCN in a mixture of various gases. Because of the dilution, all of the HCN is not absorbed during the reaction and a small amount thereof often escapes with the effluent gases. It is, therefore, of some importance to recover the HCN for re-use.

The present invention has among its objectives to improve the efficiency of applicant's patented process and obtain a practically complete recovery of residual HCN, while at the same time minimizing the necessity for the use of acid and alkali in the operation.

It is also among the objects of the present invention to provide a simple and effective process which is operated continuously and with a minimum of labor.

It is further among the objects of the present invention to conduct the operation in a substantially water-free medium and to obtain a technically usable product directly.

The invention is illustrated in the accompanying drawing, in which

Figure 2:
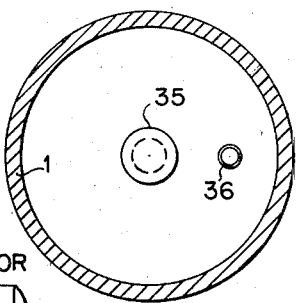
Figure 1:
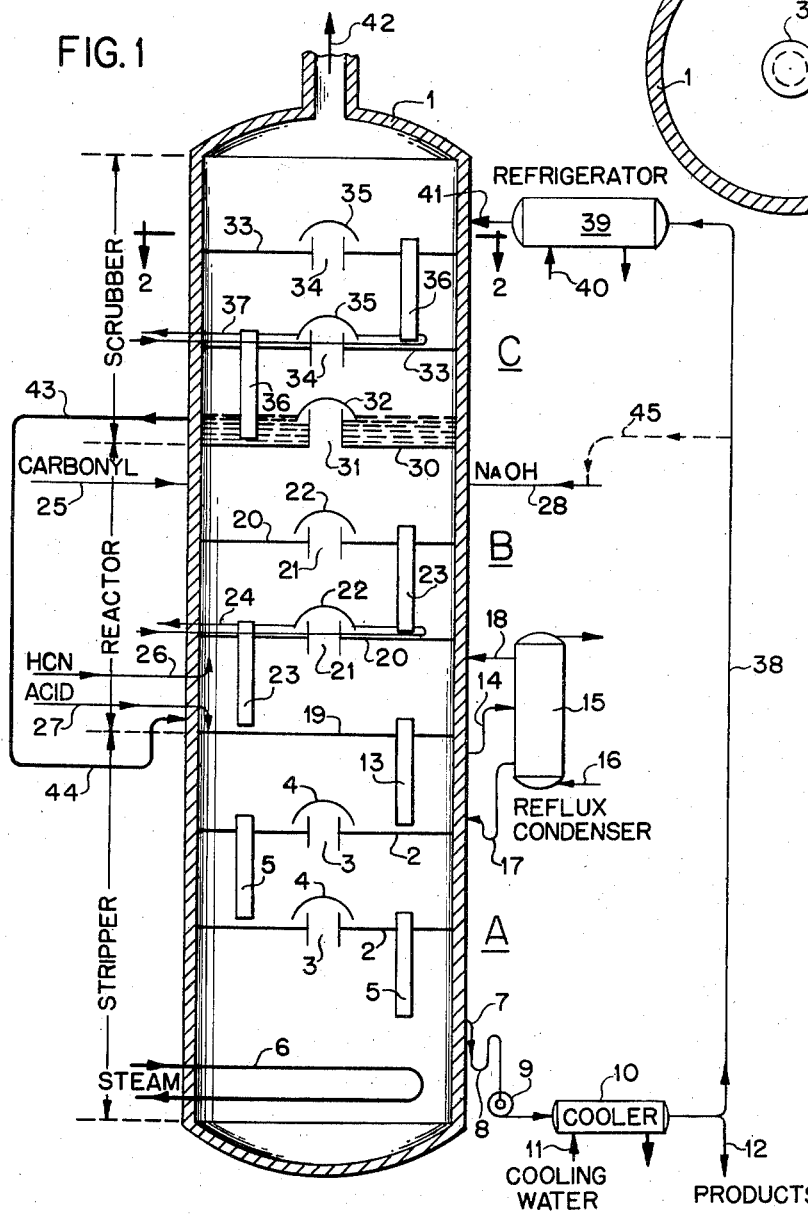

Fig. 1 is a diagrammatic cross-sectional view of a column and associated apparatus adapted for carrying out the present invention; and Fig. 2 is a horizontal cross-sectional view thereof taken along line 2—2 of Fig. 1.

Column 1, which is here shown as a single unit, is divided into three zones; the lowermost zone A is the stripper zone wherein reactants are vaporized from the product; zone B is the reaction zone wherein the cyanohydrin is produced and zone C is the scrubber zone in which the residual HCN is removed from the effluent gases and is returned to the operation.

In zone A there is shown a series of horizontal plates 2 having central openings 3 with bubble caps 4 placed over openings 3. Pipes 5 are adapted to conduct liquid downwardly over the several plates. Steam coil 6, or other heating means, are provided at the bottom of zone A. Some distance above the bottom there is an outlet 7 for the product, with a trap 8 leading to pump 9 and a connection from said pump to cooler 10, which is cooled by water 11 passing through the cooler in heat exchange relationship with the product. The latter is removed as shown at 12.

Pipe 13 connects zone B with zone A and permits the liquid from zone B to pass into zone A. Vapor outlet 14 from the top of zone A constitutes a connection for the gases into reflux condenser 15, suitably cooled to a proper temperature as shown at 16. The temperature in reflux 15 is sufficiently high to maintain HCN and carbonyl substance in the vapor state while causing condensation of the cyanohydrin which returns to zone A through pipe 17. The vapors from reflux 15 pass through inlet 18 to the lower portion of zone B. A series of plates 20 in zone B have central openings 21 and bubble caps 22 with pipes 23, allowing liquid to flow downwardly from plate to plate. Cooling coils 24 are provided on said plates to maintain suitable temperature conditions in zone B. The carbonyl substance is introduced at 25 into the upper portion of zone B, HCN is introduced at 26 into the lower portion thereof and acid is introduced at 27 into the bottom of said zone. At 28 at the upper portion thereof, a suitable alkali is introduced.

Scrubber zone C has at the bottom thereof a plate 30 having a central opening 31 covered by a bubble cap 32 whereby vapors from zone B may enter zone C, but liquid from zone C cannot flow directly into zone B. Zone C also has a series of plates 33 having central openings 34 and bubble caps 35. Pipes 36 allow liquid to flow downwardly from plate to plate. Cooling or refrigeration coils 37 are provided on plates 33.

From cooler 10 a connection 38 for part of the product leads to refrigerator 39, cooled as shown at 40 by brine or other refrigeration. From refrigerator 39 a connection 41 leads to the upper part of zone C. Outlet 42 is provided at the top of column 1 for waste gases.

A connection 43 at the bottom of zone C allows liquid to flow through pipe 44 into the bottom of zone B. In some cases a connection 45 is provided between pipe 38 and alkali inlet 28.

In the operation of the apparatus, suitable liquid ketones or aldehydes such as are set forth in the aforesaid patent may be used, such as formaldehyde and acetaldehyde. As a specific example, acetone is introduced at 25 into zone B, which is maintained at a temperature of about 25° to 60° C. A concentrated solution of sodium hydroxide is introduced into zone B at 28. Dilute HCN is introduced at 26, passing upwardly through openings 21 and bubbling through the mixture of acetone and sodium hydroxide on plates 20. The residual gases pass into zone C through opening 21. Acetic acid is introduced at 27 in sufficient amount to neutralize the sodium hydroxide and the cyanohydrin passes through pipe 13 into stripper zone A. It forms a body of liquid in the bottom of zone A, which is maintained at temperatures of 65° to 100° C. The dissolved HCN and acetone are volatilized, passing into reflux 15 where the cyanohydrin is condensed and returned to zone A while the HCN and acetone vapors pass upwardly through zone B and take part in the reaction.

The cyanohydrin from zone A is pumped through cooler 10 and part thereof passes through refrigerator 39 and into zone C, which is maintained at a temperature of about 0° to 20° C. As the refrigerated product passes downwardly over the several plates, it absorbs the residual HCN from the gases and strips the waste gases completely from HCN. The cooled solution flows through pipes 43 and 44 into the bottom of zone B and mingles with the cyanohydrin formed in said zone.

Usually the alkali introduced into zone B is in concentrated solution but in some cases it is advisable to use solid alkali and cause it to flow into the reaction zone by mixing therewith some of the cyanohydrin flowing through pipe 45.

There are a number of advantages inherent in the present procedure. The operation is continuous and is practically automatic. No purification of the product is necessary as it may be applied technically in the form in which it leaves the column. The process also effects economies in the use of steam, cooling and refrigerating means, and materials entering into the reaction. The cost of labor in the operation is low.

While the invention has been described setting forth a single specific embodiment thereof, various changes in the details may be made without departing from the principles herein set forth. For instance, the column may be of a different form than illustrated in the drawing and the several zones may be in separate units. The cooling and heating coils may be differently arranged and equivalent cooling and heating means may be substituted for the same. While the apparatus as shown has but few bubble plates, the apparatus in practice may have any desired number, depending upon the conditions of the operation. The various substances used in the procedure may be introduced at somewhat different points than shown on the drawing.

Other carbonyl compounds than those set forth may be used but they should be liquid under the conditions of operation. Other alkalies than sodium hydroxide may be used and any liquid acid capable of neutralizing the alkali may replace the acetic acid.

I claim:

1. In a continuous method of making cyanohydrins comprising causing a substance taken from the class consisting of liquid aldehydes and ketones to pass downwardly through a reaction zone, passing a gas containing HCN upwardly through said reaction zone in contact with said substance, introducing an alkali into the reaction zone, then adding an acid to neutralize said alkali and passing the reaction product into a stripping zone, heating said product to vaporize unreacted HCN and substance, and introducing the vapors so formed into the reaction zone, the improvement which comprises feeding a part of said product into the upper part of a scrubber zone and introducing gases from said reaction zone into the lower part of said scrubber zone.

2. A method according to claim 1 in which said substance is taken from the class consisting of formaldehyde, acetaldehyde and acetone.

3. A method according to claim 1 in which at least one of said zones is subdivided into a plurality of superposed chambers in communication with each other.

4. A method according to claim 1 in which the stripping, reaction and scrubber zones are superposed in the order named.

5. A method according to claim 1 in which the vapors from the stripping zone are refluxed to condense the product and return it to the stripping zone while the uncondensed vapors pass into the reaction zone.

6. A method according to claim 1 in which that part of the product fed into the scrubber zone is first refrigerated.

7. A method according to claim 1 in which that part of the product fed into the scrubber zone is first refrigerated to a temperature not over about 20° C.

8. A method according to claim 1 in which the alkali is introduced in suspension in part of said product.

9. A method according to claim 1 in which the temperature in the stripping zone is above the boiling point of the substance but below the boiling point of the product.

10. A method according to claim 1 in which the temperature of the stripping zone is about 65°–100° C.

11. A method according to claim 1 in which the temperature of the reaction zone is about 25°–60° C.

12. A method according to claim 1 in which the temperature of the scrubber zone is about 0°–20° C.

13. A method according to claim 1 in which the alkali is in a highly concentrated aqueous solution.

References Cited in the file of this patent

UNITED STATES PATENTS 2,731,490     Barsky _____ Jan. 17, 1956